(12) United States Patent
Liu et al.

(10) Patent No.: US 11,327,662 B2
(45) Date of Patent: *May 10, 2022

(54) METHOD AND SYSTEM FOR MANAGING STORAGE DEVICE

(71) Applicant: EMC IP Holding Company LLC, Hopkinton, MA (US)

(72) Inventors: Yousheng Liu, Beijing (CN); Geng Han, Beijing (CN); Jibing Dong, Beijing (CN); Ruiyong Jia, Beijing (CN); Jian Gao, Beijing (CN); Xinlei Xu, Beijing (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/798,217

(22) Filed: Feb. 21, 2020

(65) Prior Publication Data

US 2020/0264785 A1    Aug. 20, 2020

Related U.S. Application Data

(63) Continuation of application No. 15/623,636, filed on Jun. 15, 2017, now Pat. No. 10,572,163.

(30) Foreign Application Priority Data

Jun. 16, 2016    (CN) .......................... 201610431451.X (51) Int. Cl.
*G06F 3/06* (2006.01)
*G06F 11/10* (2006.01)

(52) U.S. Cl.
CPC ............ *G06F 3/0619* (2013.01); *G06F 3/065* (2013.01); *G06F 3/0665* (2013.01); *G06F 3/0689* (2013.01); *G06F 11/1076* (2013.01)

(58) Field of Classification Search
CPC .... G06F 3/0619; G06F 3/0665; G06F 3/0689; G06F 3/065

(Continued)

(56) References Cited

U.S. PATENT DOCUMENTS

| 10,572,163 B2 | 2/2020 | Liu et al. |
| 2001/0034809 A1 | 10/2001 | Ogawa |

(Continued)

OTHER PUBLICATIONS

Non-Final Office Action issued in related U.S. Appl. No. 15/623,636, dated Aug. 28, 2018.

(Continued)

*Primary Examiner* — Than Nguyen
(74) *Attorney, Agent, or Firm* — Brian J. Colandreo; Mark H. Whittenberger; Holland & Knight LLP (57) ABSTRACT

Embodiments of the present invention provide a method and system for managing a storage area. In one embodiment of the present invention, there is provided a method for managing a storage areas, comprising: obtaining a storage area in a storage system according to a predefined dividing rule; determining status regarding whether the storage area has been used; setting a status identifier for the storage area based on the use status; and managing the storage area based on the status identifier. In another embodiment, there is proposed a system for managing a storage area, comprising: one or more processors; a memory coupled to at least one processor of the one or more processors; computer program instructions stored in the memory which, when executed by the at least one processor, cause the system to execute a method for managing a storage area.

16 Claims, 9 Drawing Sheets

(58) Field of Classification Search
USPC .................................................. 711/114, 161
See application file for complete search history.

(56) References Cited

U.S. PATENT DOCUMENTS

| | | | |
|---|---|---|---|
| 2004/0103246 A1* | 5/2004 | Chatterjee | G06F 11/008 |
| | | | 711/114 |
| 2011/0276859 A1 | 11/2011 | Baba et al. | |
| 2013/0086394 A1* | 4/2013 | Shimmitsu | G06F 21/78 |
| | | | 713/193 |
| 2016/0210066 A1 | 7/2016 | Yamaura et al. | |
| 2017/0364289 A1 | 12/2017 | Liu et al. | |

OTHER PUBLICATIONS

Final Office Action issued in related U.S. Appl. No. 15/623,636, dated Feb. 26, 2019.
Non-Final Office Action issued in related U.S. Appl. No. 15/623,636 dated May 22, 2019.
Notice of Allowance issued in related U.S. Appl. No. 15/623,636, dated Oct. 17, 2019.
First Chinese Office Action issued in related CN Application Serial No. 201610431451.X dated Nov. 4, 2019.

* cited by examiner

METHOD AND SYSTEM FOR MANAGING STORAGE DEVICE

RELATED APPLICATIONS

The subject application is a continuation of U.S. application Ser. No. 15/623,636; filed Jun. 15, 2017, which claims priority from Chinese Patent Application Number CN201610431451.X, filed on Jun. 16, 2016 at the State Intellectual Property Office, China, titled "METHOD AND SYSTEM FOR MANAGING STORAGE DEVICE" the contents of which are herein incorporated by reference in its entirety.

FIELD

Various embodiments of the present invention relate to storage management, and more specifically, to a method and system for managing a storage device in a storage system (e.g. Redundant Array of Independent Disks, RAID).

BACKGROUND

With the development of data storage techniques, various data storage devices now provide users with higher data storage capacity, and also their data access speed has been increased greatly. Besides the increase of data storage capacity, users also impose greater demands on data reliability and response time of storage systems.

So far various RAID-based data storage systems have been developed to increase data reliability. When one or more disks in a storage system fail, data in failing disks can be recovered from data in other disks operating normally. However, since such a storage system comprises multiple disks, during the initialization of the storage system the multiple disks have to be initialized, which leads to lower initialization efficiency and unsatisfactory response efficiency of the storage system.

SUMMARY

Therefore, it is desirable to develop and implement a technical solution that can reduce response time of a storage system and further improve access efficiency of the storage system. It is desired that the technical solution can be compatible with existing storage systems and manage storage areas in the storage system more efficiently without adding extra hardware devices to existing storage systems.

In one embodiment of the present invention, there is provided a method for managing a storage area, comprising: obtaining a storage area in a storage system according to a predefined dividing rule; determining status regarding whether the storage area has been used; setting a status identifier for the storage area based on the use status; and managing the storage area based on the status identifier.

In one embodiment of the present invention, there is provided a system for managing a storage area, comprising: one or more processors; a memory coupled to at least one processor of the one or more processors; computer program instructions stored in the memory which, when executed by the at least one processor, cause the system to: obtain a storage area in a storage system according to a predefined dividing rule; determine status regarding whether the storage area has been used; set a status identifier for the storage area based on the use status; and manage the storage area based on the status identifier.

There is proposed an apparatus for managing a storage area, comprising: an obtaining module configured to obtain a storage area in a storage system according to a predefined dividing rule; a determining module configured to determine status regarding whether the storage area has been used; a setting module configured to set a status identifier for the storage area based on the use status; and a management module configured to manage the storage area based on the status identifier.

With the technical solution of the present invention, response time of the storage system can be reduced, and further storage areas in the storage system can be managed with higher efficiency.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
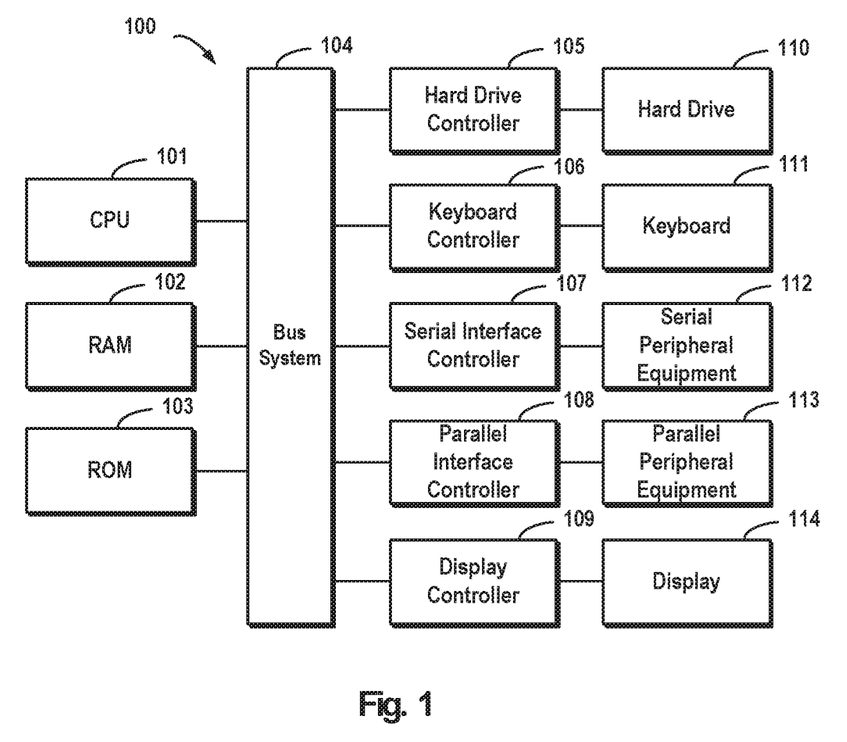
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) may combine multiple storage devices in to an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc. The operating system may regard a disk array, consisting of multiple storage devices, as a single logical storage unit or disk. By partitioning the disk array into multiple stripes, data may be distributed across multiple storage devices, so that low delay and high bandwidth is achieved, and data can be recovered to some extent when partial disks are broken.

Figure 2A:
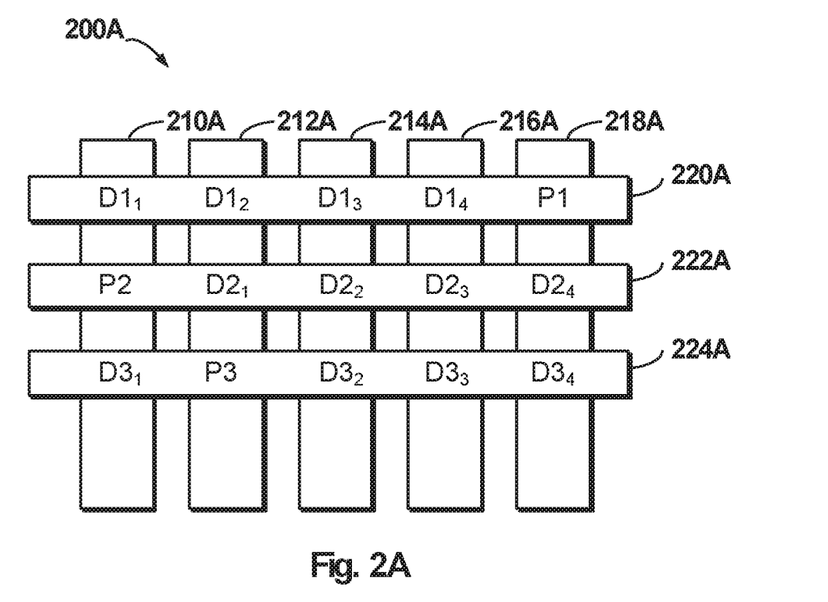
FIG. 2A schematically illustrates a schematic view of a structure of a Redundant Array of Independent Disks according to one technical solution, FIG. 2B schematically illustrates a schematic view of rebuilding process of a Redundant Array of Independent Disks according to one technical solution.

FIG. 2A schematically illustrates a schematic view 200A of a structure of RAID according to one technical solution. In this figure, working principles of RAID are illustrated by taking RAID-5, which consists of five independent storage devices (210A, 212A, 214A, 216A and 218A), as an example. It should be noted although in FIG. 2A there are schematically shown five storage devices, in other embodiments more or less storage devices may be comprised according to different versions of RAID. Moreover, although in FIG. 2A there are shown stripes 220A, 222A and 224A, other examples the RAID system may further comprise a different number of stripes.

In RAID, a stripe crosses multiple physical storage devices (for example, the stripe 220A crosses the storage devices 210A, 212A, 214A, 216A and 218A). The stripe may simply be considered as a storage area among multiple storage devices which satisfies a given address range. Data stored in the stripe 220 comprises multiple parts: a data block $D1_1$ stored in the storage device 210A, a data block $D1_2$ stored in storage device the 212A, a data block $D1_3$ stored in the storage device 214A, a data block $D1_4$ stored in the storage device 216A, and a data block P1 stored in the storage device 218A. In this example, the data blocks $D1_1$, $D1_2$ $D1_3$ and $D1_4$ are stored data, and the data block P1 is the parity of the stored data.

The mode of storing data in other stripes is similar to that in the stripe 220A, and the difference is that parity about other data block may be stored in other storage device than the storage device 218A. In this way, when one of the multiple storage devices 210A, 212A, 214A, 216A and 218A fails, data in the failing device may be recovered from other normal storage devices.

Figure 2B:
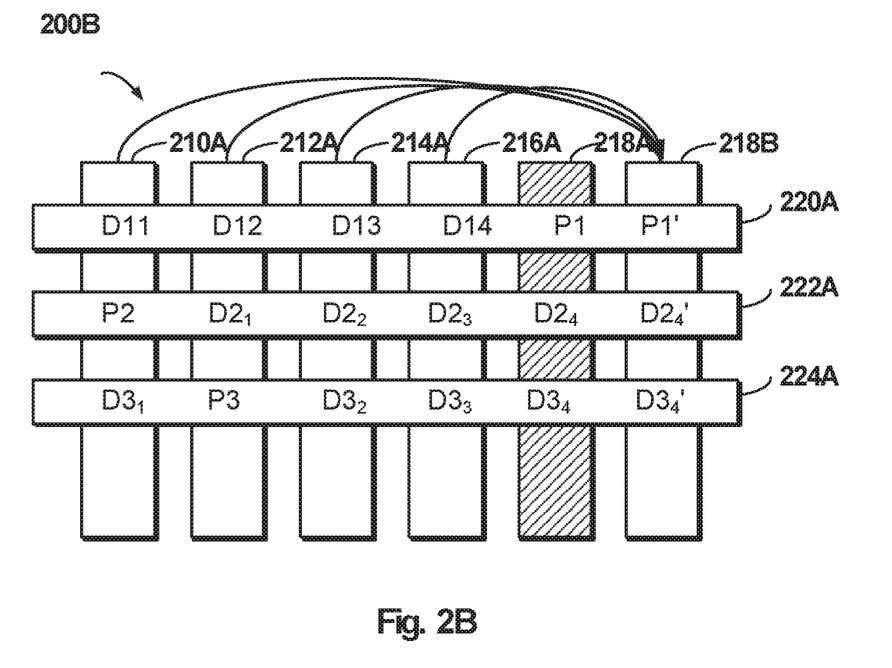

FIG. 2B schematically illustrates a schematic view 200B of rebuilding process of RAID. As shown in FIG. 2B, when one storage device (e.g., the storage device 218A shown in shadow) fails, data may be recovered from the remaining storage devices 210A, 212A, 214A and 216A that operate normally. At this point, a new backup storage device 218B may be added to RAID to replace the storage device 218A. In this way, recovered data may be written to 218B, and system rebuilding may be realized.

RAID can provide more reliable data storage. Nonetheless, since RAID provides a large amount of redundancy storage, it will take much time to initialize the redundancy storage during the initialization operation of RAID, which leads to lower initialization efficiency. On the other hand, if only a small part of storage spaces in RAID are used, then for a newly added backup storage device, it also might take quite some time to perform initialization on a storage area, which is associated with the unused part of RAID, in the backup storage device in the rebuilding stage of RAID.

In the typical initialization stage of RAID devices, initialization needs to be performed on each storage device in RAID. Specifically, "0" may be written to a storage device to clear data in the storage device so as to implement the initialization operation. For example, regarding RAID shown in FIG. 2A, the parity to the data that only includes "0" is also "0" according to the RAID algorithm principle. Initialization may be implemented by writing "0" to a storage area of each storage device. Although the operation for writing "0" may be concurrently performed to the multiple storage devices 210A, 212A, 214A, 216A and 218A, where the storage devices comprise large storage spaces, the operation for writing "0" will cost much time.

In view of the foregoing drawbacks, the embodiments of the present invention propose an efficient method for managing a storage area in RAID. Specifically, the method for managing a storage area according to one embodiment of the present invention comprises: obtaining a storage area in a storage system according to a predefined dividing rule; determining use status regarding whether the storage area has been used; setting a status identifier for the storage area based on the use status; and managing the storage area based on the status identifier.

Figure 3:
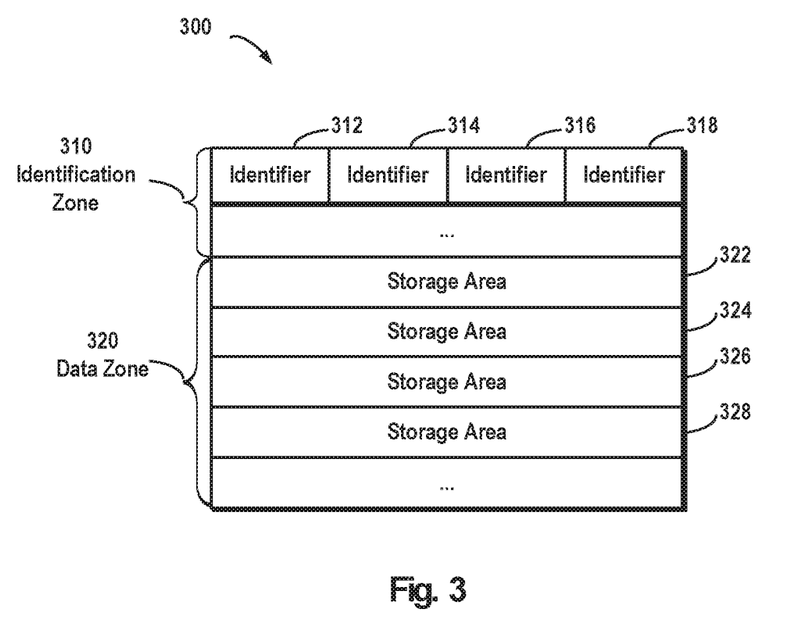
FIG. 3 schematically illustrates a schematic view of an example for managing a storage area according to one technical solution.

With reference to FIG. 3, detailed illustration is presented below to principles of the various embodiments of the present invention. FIG. 3 shows a schematic view 300 of an example of managing a storage area according to one embodiment of the present invention. As shown in FIG. 3, an identification zone 310 may be provided to record status regarding whether a data zone 320 in RAID has been used. Note in different embodiments of the present invention the identification area 310 may be disposed in different storage spaces. For example, a dedicated storage space for the identification zone 310 may be allocated in a certain storage device in RAID, or a storage space for the identification zone 310 may be allocated in a separate dedicated storage device.

Specifically, multiple identifiers 312, 314, 316 and 318 may be set in the identification zone 310 to represent respective status regarding whether storage areas 322, 324, 326 and 328 in the data zone 320 have been used. For example, the identifier may occupy one bit of storage space, e.g., "1" may be defined as "used" while "0" may be defined as "unused." Those skilled in the art may further use other data structure to store use status of respective storage areas according to the principles of the present invention described herein.

With the structure as shown in FIG. 3, in the initialization stage of RAID, there is no need to physically clear data in each physical storage area one by one, but only status of an identifier associated with each physical storage area needs to be set as "unused." In a subsequent write operation, status of the identifier may be changed. Later in other read, write operations or rebuilding operation on RAID, corresponding processing may be performed based on status of the identifier. In this way, time for the initialization operation may be reduced significantly, and time for the rebuilding operation reduced to some extent.

Figure 4:
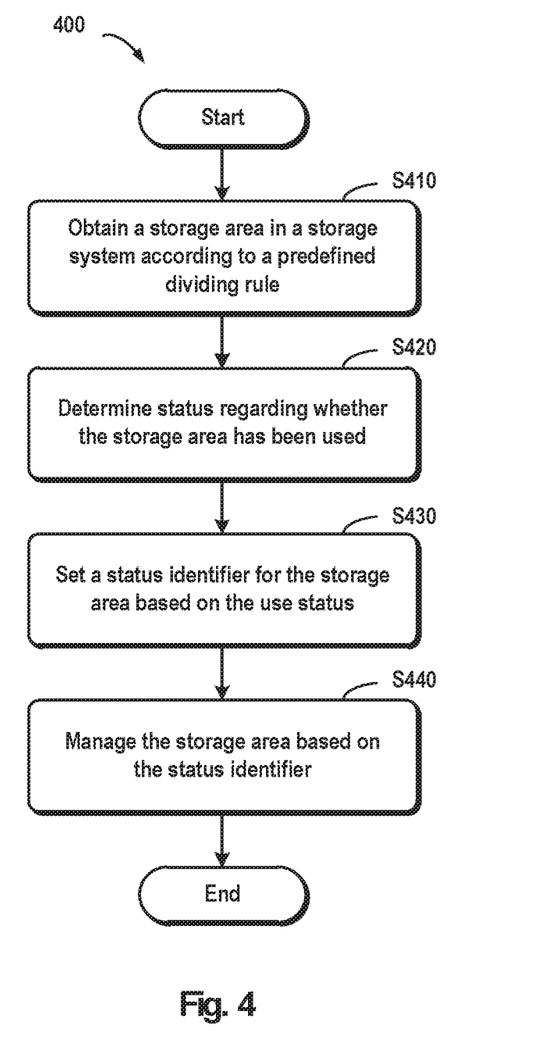
FIG. 4 schematically illustrates a flowchart of a method for managing a storage area according to one embodiment of the present invention.

FIG. 4 schematically shows a flowchart 400 of a method for managing a storage area according to one embodiment of the present invention. First of all, in step S410 a storage area in a storage system is obtained according to a predefined dividing rule. In this step, storage spaces in the storage system may be divided into different storage areas according to different rules. Note in the context of the present invention the storage system may be a Redundant Array of Independent Disks or other type of storage system.

In step S420, use status regarding whether the storage area has been used is determined. In this step, whether the storage system has been used may be determined based on historical operations on the storage area. For example, storage spaces in the storage system are initialized in the initialization stage, at this point storage spaces are in "unused" status.

Following the initialization stage, after a write operation is performed to a storage space, the storage space is in "used" status.

In step S430, a status identifier is set for the storage space based on the use status. In this step, a status identifier may be set based on the "unused"/"used" status as determined in step S420. For instance, in the above example of FIG. 3, use status of the storage area is represented by the identifier 312, and then in the initialization stage the identifier 312 may be set as "unused." Note "unused" in the identifier 312 represents the storage area 322 is in unused status at this moment. Although the storage area 322 might have data stored therein (i.e., data in the storage area 322 is not physically cleared), since at this point the identifier 312 indicates the storage area 322 is in "unused" status, data in this area is all data 0 to the outside.

In step S440, the storage area is managed based on the status identifier. While performing operation on the storage system, a subsequent operation step may be determined based on "used" or "unused" as indicated by the identifier, so that the storage area is managed.

In one embodiment of the present invention, the determining use status regarding whether the storage area has been used comprises: in response to receipt of an initialization operation to initialize the storage system, setting the status identifier to "unused" status.

Figure 5:
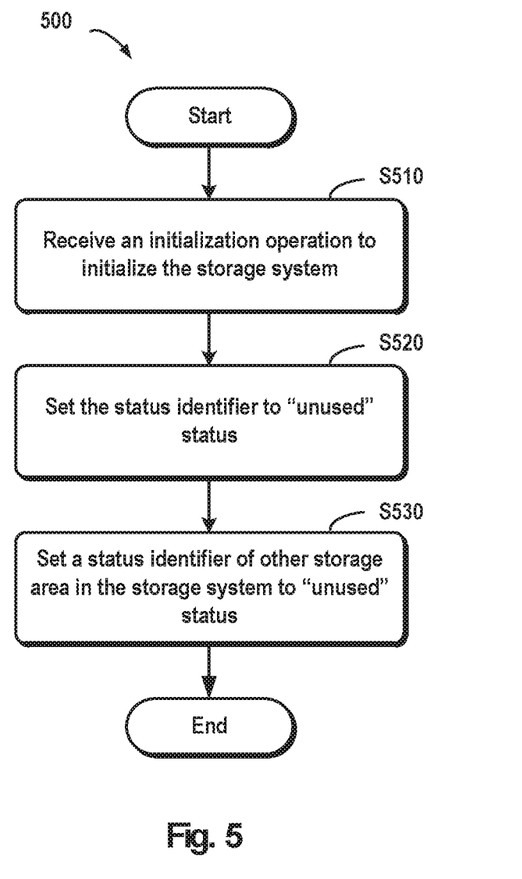
FIG. 5 schematically illustrates a flowchart of an initialization operation of a method for managing a storage area according to one embodiment of the present invention.

Specifically, FIG. 5 schematically shows a flowchart 500 of the initialization operation of a method for managing a storage area according to one embodiment of the present invention. As shown in this figure, in step S510 an initialization operation to initialize the storage system is received. In various embodiments of the present invention, the initialization operation may be automatically triggered by a command from an administrator of the storage system or by other setting in the storage system. Next in step S520, the status identifier of the storage area is set to "unused" status. In the foregoing example of FIG. 3, when the identifier 312 is used for indicating status of the storage area 322, the identifier 312 may be set as "unused" in this step.

Note the steps S510 and S520 above show an operation on only one storage area in the storage system. In other embodiments, in the initialization stage identifiers of other storage areas in the storage system may further be set as "unused" so as to complete the initialization operation on each storage area in the storage system.

Specifically, in one embodiment of the present invention, there is further comprised: in response to receipt of the initialization operation to initialize the storage system, setting status identifiers of other storage areas in the storage system to "unused" status. Still with reference to FIG. 5, the specific step of the operation is shown in step S530. Specifically, when the data structure in FIG. 3 above is adopted, the identifiers 314, 316 and 318 for indicating status of the storage areas 324, 326 and 328 may be set as "unused." In this way, the initialization operation for each storage area in the storage system may be completed.

Note in a conventional initialization operation, "0" has to be written to each bit in a storage area. Unlike the conventional initialization operation, the present invention proposes a technical solution for "logically" initializing a storage area. By setting a status identifier of the storage area to the "unused" status, such the purpose for representing all data in the storage area by "0" may be accomplished, and further the "logical" initialization may be implemented. In this way, the operation to physically initialize each storage area may be separately moved to the duration of access to each storage area, preventing the situation that, on bootup of the storage system, physical initialization has to be executed on storage areas one by one and further a large quantity of initialization time is occupied.

Note in the various embodiments of the present invention, it is not required that each storage area in the storage system must use a status identifier to represent status regarding whether the storage area has been used. Instead, in the storage system a status identifier may be set for one or more storage areas, and the storage area(s) may be managed based on status of the status identifier. Although applying the technical solution of the present invention to only part of storage areas in the storage system will not improve the efficiency of the initialization stage and the rebuilding stage to a maximum extent, in this way optimization may be performed to at least one storage area in the storage system, and it helps to increase the operation efficiency of the storage system to some extent.

When performing a write operation on the storage system, based on information about a relevant address in the write operation, the storage system may determine to which storage area in the storage system the write will be executed. If the storage area associated with the write operation is managed based on the method of the present invention, further operation may be performed based on a status identifier of the storage area.

In one embodiment of the present invention, the managing the storage area based on the status identifier comprises: in response to receipt of a write operation to write to the storage area, determining status of the status identifier; in response to the status identifier being "unused": clearing data in the storage area; writing data to a target address; and setting the status identifier as "used." In one embodiment of the present invention, there is further comprised: in response to the status identifier being "used," writing target data associated with the write operation to a target address indicated by the write operation.

Figure 6:
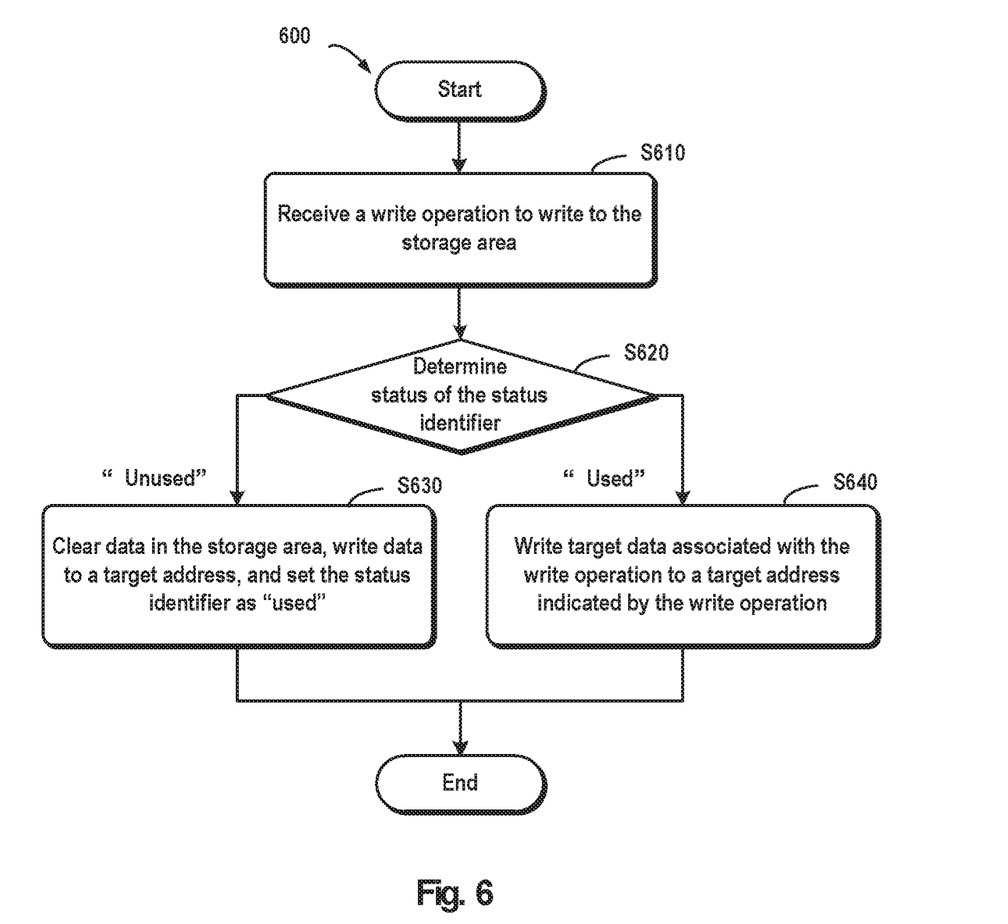
FIG. 6 schematically illustrates a flowchart of a write operation of a method for managing a storage area according to one embodiment of the present invention.

Specifically, FIG. 6 schematically shows a flowchart 600 of a write operation of a method for managing a storage area according to one embodiment of the present invention. As shown in FIG. 6, when status of the status identifier differs, a different operation will be performed. First of all, in step S610 a write operation to write to a storage area is received. Then in step S620 content of a status identifier associated with the storage area is determined. If the status identifier indicates "unused," then the operation flow proceeds to step S630, in which step a clearing operation is performed on the storage area and subsequently data is written thereto. Note the storage area is not physically cleared in the initialization stage. Hence before actually writing data to the storage area, first data in the storage area has to be cleared, i.e., an operation for writing "0" is physically executed in this step.

Next, to-be-written data may be written to an address associated with the write operation, and the status identifier is modified to "used" status. Note in this step, first status of the identifier may be modified and then data is written to the storage area, or first data is written and then status of the identifier is modified. Note the read and write operation described in the context of the present invention may be used in collaboration with a locking operation in the prior art, so as to prevent the occurrence of problems such as read and write conflict.

In step S620, when the status identifier indicates "used," it means the physical initialization of the storage area has been completed at this point and can be used like an ordinary storage area. Thus, the operation flow proceeds to step S630, and target data associated with the write operation is written to a target address indicated by the write operation.

Status of the status identifier might be changed in a write operation but will not change in a read operation. In one embodiment of the present invention, the managing the storage area based on the status identifier comprises: in response to receipt of a read operation to read from the storage area, determining status of the status identifier; and in response to the status identifier being "unused," returning data "0;" otherwise returning target data from a target address, indicated by the read operation, in the storage area.

Figure 7:
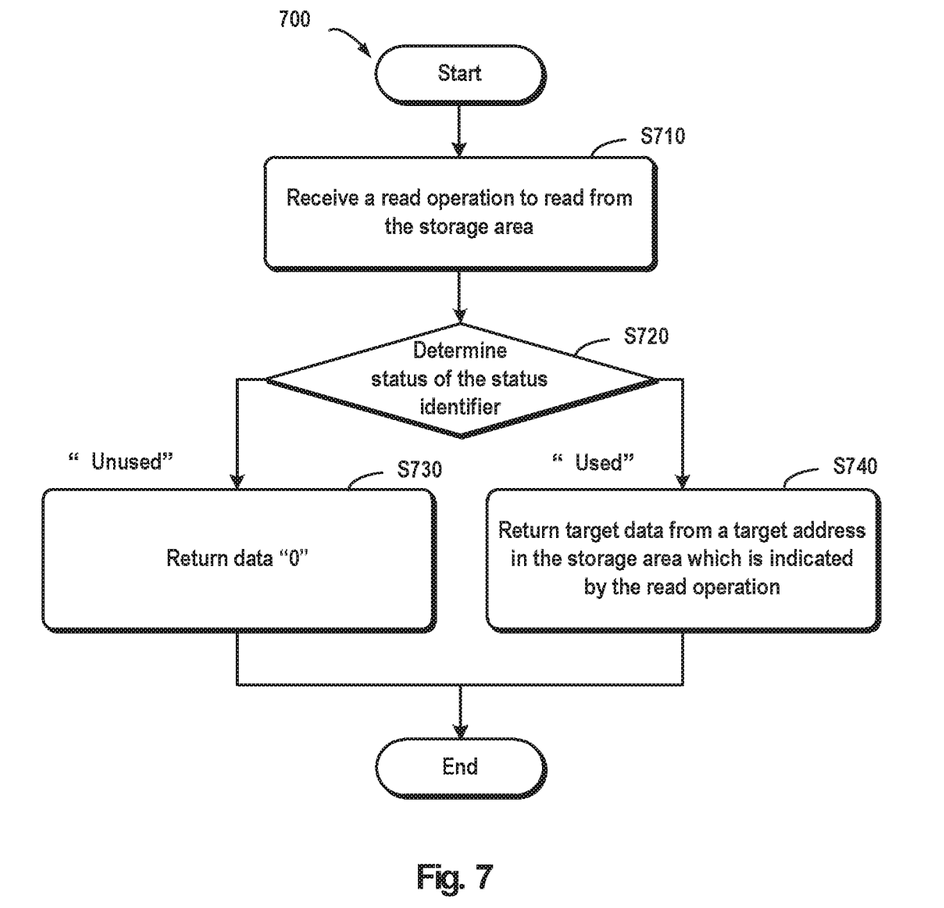
FIG. 7 schematically illustrates a flowchart of a read operation of a method for managing a storage area according to one embodiment of the present invention.

FIG. 7 schematically shows a flowchart 700 of a read operation of a method for managing a storage area according to one embodiment of the present invention. Specifically, in step S710 a read operation to read from the storage area in the storage system is received. Next in step S720, status of a status identifier associated with the storage area is determined. When the status identifier indicates "unused," it means the storage area currently has no data available for the outside to access. Thus, the operation flow proceeds to step S730 and data "0" is returned.

Further, when in step S720 the status identifier is determined as "used," the operation flow proceeds to step S730 in which target data is returned from a target address indicated by the read operation in the storage area. Note if the status identifier indicates "used," it means data available for the outside to access is already stored in the storage area associated with the read operation, so the subsequent operation flow is similar to a conventional data read operation.

According to the various embodiments of the present invention, by using a status identifier to indicate status of a storage area in the storage system, status of the status identifier may be simply set as "unused" during the initialization operation of the storage system to indicate the storage area has been "logically" initialized, rather than executing a physical initialization operation on each bit in the storage area one by one. Like the initialization procedure, in the rebuilding procedure a rebuilding operation may be performed likewise on a storage area that is in "unused" status, and further an object of reducing the rebuilding time is achieved.

In one embodiment of the present invention, the managing the storage area based on the status identifier comprises: in response to receipt of a rebuilding operation to rebuild the storage system, determining status of the status identifier; in response to the status identifier being "unused," skipping the processing on the storage area.

Figure 8:
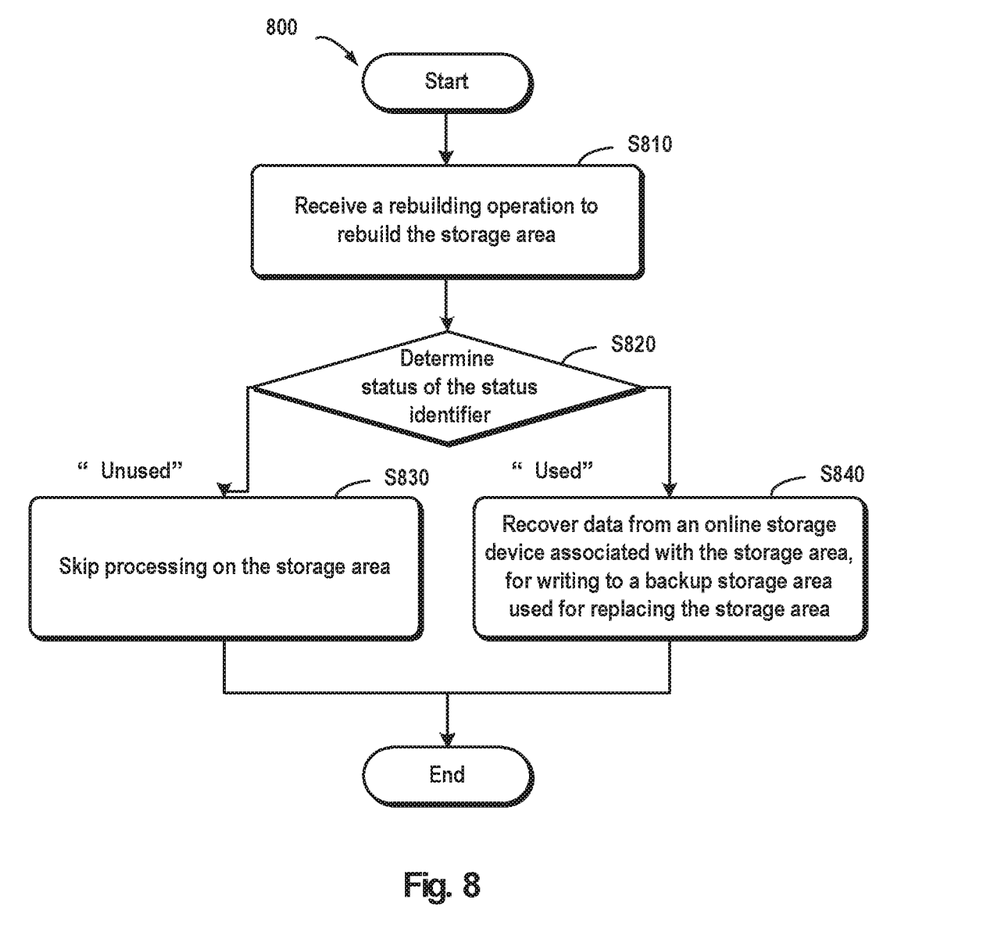
FIG. 8 schematically illustrates a flowchart of a rebuilding operation of a method for managing a storage area according to one embodiment of the present invention.

FIG. 8 schematically shows a flowchart 800 of a rebuilding operation of a method for managing a storage area according to one embodiment of the present invention. As shown in FIG. 8, in step S810 a rebuilding request for rebuilding the storage system is received. Note the rebuilding request in the step may be triggered based on a manual operation of administrators of the storage system, or automatically sent based on configuration information of the storage system. Next in step S820, status of the status identifier is determined; when the status identifier indicates "unused," the operation flow proceeds to step S830 for subsequent processing.

In this step, the "unused" status means the failing storage area has not been used since the initialization, and data that is stored in the storage area is inessential to the storage system, i.e., the storage system will consider data stored in the failing storage area as invalid. In other words, no matter which data is stored, there is no need to perform any recovery operation on the data in the rebuilding procedure of the storage system, but to skip the storage area and process the next storage area.

According to traditional techniques for storage system management, data in each storage area is physically cleaned in the initialization stage of the storage system. Since the data read operation on the storage system does not record which storage area has been used and which one has not been used, there is a need to perform recovery processing on both data in a storage area which has been used and not used at all, and store recovered data to a backup storage device. Therefore, the traditional storage system will spend a longer time in rebuilding. Compared with traditional techniques, with the technical solution of the present invention, recovery may only be performed to "used" storage areas in the storage system, and "unused" areas do not require any recovery processing. When quite many storage areas in the storage system have not been used (e.g., not long after the initialization of the storage system), failure in one storage device will not lead to a longer rebuilding time.

Specifically, suppose the storage system comprises 10 storage areas, among which only one storage area is in "used" status and the other nine are in "unused" status. With the technical solution of the present invention, only data in the storage area whose status is "used" needs to be recovered during rebuilding. However, based on traditional technical solutions, data in all 10 storage areas has to be recovered during rebuilding.

In one embodiment of the present invention, there is further comprised: based on the status identifier being "used," recovering data from an online storage device associated with the storage area, to be written to a backup storage area used for replacing the storage area.

For used storage areas in the storage system, the rebuilding operation is similar to the existing procedure. Specifically, when the status identifier is determined as "used" in step S820, the operation flow proceeds to step S840. In this step, data is recovered from an online storage device associated with the storage area, and the recovered data is to be written to a backup storage area used for replacing the storage area. Here the online storage device refers to a normal storage device in the storage system which does not fail.

Referring back to FIG. 2, for example, when the storage device 218A shown in shadow in FIG. 2 fails, the storage devices 210A, 212A, 214A and 216A that do not fail are online storage devices. In this example, data P1 that used to be stored in the failing storage device 218A will be recovered from the online storage devices 210A, 212A, 214A and 216A, and the recovered data P1 will be written to a backup storage device 218B used for replacing the failing storage device 218A.

In one embodiment of the present invention, there is further comprised: during the initialization operation to initialize the storage system, forbidding a read operation and a write operation from being performed on storage areas in the storage system. In order to better satisfy the data consistency of the storage system, storage areas in the storage system may be locked during the initialization. After the completion of the initialization operation, storage areas may be unlocked and data access to them may be resumed.

The various embodiments of the present invention have been described above by taking RAID as a concrete example of the storage system. Note when another storage system is adopted, for example, when a conventional ordinary array of disks where there is no redundancy acts as the storage system, by dividing the array of disks into multiple storage areas and using a corresponding status identifier to represent status of each storage area, time overheads for the initialization of the storage system may also be reduced significantly during the initialization operation.

In one embodiment of the present invention, the obtaining a storage area in the storage system based on a predefined dividing rule comprises: taking one or more stripes in the storage system as the storage area. The various embodiments of the present invention have been described above by taking only one stripe in RAID as an example of storage areas. Note multiple stripes in RAID may further be used as one storage area in other embodiments.

Those skilled in the art may define how many stripes are comprised in one storage area, according to principles of the various embodiments of the present invention. If one storage area comprises a large number of stripes, then data storage spaces occupied by status identifiers may be reduced. When one storage area comprises a smaller number of stripes (e.g., only one), operation may be performed on each stripe in the storage system with finer granularity. Those skilled in the art may take these two aspects into consideration and set one identifier to represent the use status of multiple stripes.

With the technical solution as described in the present invention, the efficiency during the initialization operation can be improved greatly. Specifically, suppose a RAID 5 type storage system is adopted, wherein the storage system comprises $N_{disk}$ disks, the size of each disk is $S_{disk}$, the size of a chunk in disks is $S_{chunk}$, one bit represents the use status of $N_{stripe/bit}$ stripes. Then, the size for storing the status identifier may be calculated as below:

Raid Group size: $S_{RG}=(N_{disk}-1)*S_{disk}$
Stripe Size: $S_{stripe}=(N_{disk}-1)*S_{chunk}$
Stripe Number per Raid Group: $N_{stripe}=S_{RG}/S_{stripe}$
Bits Number for storing status identifier: $N_{bit}=N_{stripe}/N_{stripe/bit}$ Bytes number for storing status identifier:

$$S_{bitmap} = N_{bit} / 8$$
$$= N_{stripe} / N_{stripe/bit} / 8$$
$$= S_{RG} / S_{stripe} / N_{stripe/bit} / 8$$
$$= [(N_{disk} - 1) * S_{disk}] / [(N_{disk} - 1) * S_{chunk}] / N_{stripe/bit} / 8$$
$$= S_{disk} / S_{chunk} / N_{stripe/bit} / 8$$

Hence, the ratio of the bytes number for storing the status identifier to the RAID group size is:

$$S_{bitmap} / S_{RG} = [S_{disk} / S_{chunk} / N_{stripe/bit} / 8] / [(N_{disk} - 1) * S_{disk}]$$
$$= 1 / [S_{chunk} * N_{stripe/bit} * 8 * (N_{disk} - 1) * S_{disk}]$$

When a RAID group chunk size is from 4 KB to 512 KB, assume that $N_{stripe/bit}=1$, $N_{disk}=5$, $S_{disk}=1$ TB, and then the bytes number for storing the status identifier will occupy 32 MB to 256 KB storage spaces, which is only 0.0007629% to 0.0000060% of the RAID group's space.

When performing the initialization operation, since write is performed only to the area $S_{bitmap}$ for storing the status identifier rather than to the entire RAID group's space, the efficiency of initialization may be improved greatly. According to the foregoing calculation equations, the time occupied by the initialization operation will be decreased to 0.0007629% to 0.0000060% of the original time.

Figure 9:
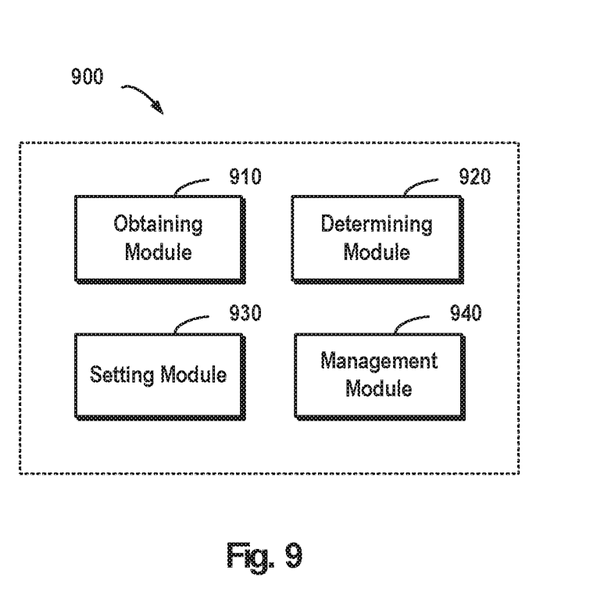
FIG. 9 schematically illustrates a block diagram of an apparatus for managing a storage area according to one embodiment of the present invention.

FIG. 9 schematically shows a block diagram 900 of an apparatus for managing a storage area according to one embodiment of the present invention. As shown in FIG. 9, there is proposed an apparatus for managing a storage area, comprising: an obtaining module 910 configured to obtain a storage area in a storage system according to a predefined dividing rule; a determining module 920 configured to determine status regarding whether the storage area has been used; a setting module 930 configured to set a status identifier for the storage area based on the use status; and a management module 940 configured to manage the storage area based on the status identifier.

In one embodiment of the present invention, the determining module 920 comprises: a status setting module configured to, in response to receipt of an initialization operation to initialize the storage system, set the status identifier to "unused" status.

In one embodiment of the present invention, the status setting module is further configured to: in response to receipt of the initialization operation to initialize the storage system, set a status identifier of other storage area in the storage system to "unused" status.

In one embodiment of the present invention, the management module 940 comprises: a first write management module configured to, in response to receipt of a write operation to write to the storage area, determine status of the status identifier; and a second write management module configured to: in response to the status identifier being "unused," clear data in the storage system; write data to a target address; and set the status identifier as "used."

In one embodiment of the present invention, there is further comprised: a third write management module configured to, in response to the status identifier being "used," write target data associated with the write operation to a target address indicated by the write operation.

In one embodiment of the present invention, the management module 940 comprises: a first read management module configured to, in response to receipt of a read operation to read from the storage area, determine status of the status identifier; and a second read management module configured to, in response to the status identifier being "unused," return "empty;" otherwise return target data from a target address in the storage area which is indicated by the read operation.

In one embodiment of the present invention, the management module 940 comprises: a first rebuilding management module configured to, in response to receipt of a rebuilding operation to rebuild the storage system, determine status of the status identifier; and a second rebuilding management module configured to, in response to the status identifier being "unused," skip processing on the storage area.

In one embodiment of the present invention, the management module 940 further comprises: a third rebuilding management module configured to, in response to the status identifier being "used," recover data from an online storage device associated with the storage area, for writing to a backup storage area used for replacing the storage area.

In one embodiment of the present invention, there is further comprised: a locking module configured to forbid a read operation and a write operation from being performed on a storage area in the storage system, during the initialization operation to initialize the storage system.

In one embodiment of the present invention, the obtaining module is further configured to: take one or more stripes in the storage system as the storage area.

In one embodiment of the present invention, there is provided a system for managing a storage area, comprising:

one or more processors; a memory coupled to at least one processor of the one or more processors; computer program instructions stored in the memory which, when executed by the at least one processor, cause the system to: obtain a storage area in a storage system according to a predefined dividing rule; determine status regarding whether the storage area has been used; set a status identifier for the storage area based on the use status; and manage the storage area based on the status identifier.

In one embodiment of the present invention, the computer program instructions, when executed by the at least one processor, further cause the system to: in response to receipt of an initialization operation to initialize the storage system, set the status identifier to "unused" status.

In one embodiment of the present invention, the computer program instructions, when executed by the at least one processor, further cause the system to: in response to receipt of the initialization operation to initialize the storage system, set a status identifier of other storage area in the storage system to "unused" status.

In one embodiment of the present invention, the computer program instructions, when executed by the at least one processor, further cause the system to: in response to receipt of a write operation to write to the storage area, determine status of the status identifier; and in response to the status identifier being "unused," clear data in the storage system; write data to a target address; and set the status identifier as "used."

In one embodiment of the present invention, the computer program instructions, when executed by the at least one processor, further cause the system to: in response to the status identifier being "used," write target data associated with the write operation to a target address indicated by the write operation.

In one embodiment of the present invention, the computer program instructions, when executed by the at least one processor, further cause the system to: in response to receipt of a read operation to read from the storage area, determine status of the status identifier; and in response to the status identifier being "unused," return "empty;" otherwise return target data from a target address in the storage area which is indicated by the read operation.

In one embodiment of the present invention, the computer program instructions, when executed by the at least one processor, further cause the system to: in response to receipt of a rebuilding operation to rebuild the storage system, determine status of the status identifier; and in response to the status identifier being "unused," skip processing on the storage area.

In one embodiment of the present invention, the computer program instructions, when executed by the at least one processor, further cause the system to: in response to the status identifier being "used," recover data from an online storage device associated with the storage area, for writing to a backup storage area used for replacing the storage area.

In one embodiment of the present invention, the computer program instructions, when executed by the at least one processor, further cause the system to: forbid a read operation and a write operation from being performed on a storage area in the storage system, during the initialization operation to initialize the storage system.

In one embodiment of the present invention, the computer program instructions, when executed by the at least one processor, further cause the system to: take one or more stripes in the storage system as the storage area.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for managing a storage area, comprising:
    obtaining a storage area in a storage system according to a predefined dividing rule;
    determining status regarding whether the storage area has been used includes, in response to receipt of an initialization operation to initialize the storage system, setting the status identifier to a status that indicates that the storage area does not currently have data available for access without physically clearing data stored in the storage area prior to the initialization operation from the storage area;
    setting a status identifier for the storage area based on the use status;
    managing the storage area based on the status identifier;
    receiving a rebuilding operation to rebuild the storage system, determining a status of the set status identifier, wherein the status identifier may be indicative of a failing storage area that has not been used since the receipt of the initialization operation and data stored in the storage area is inessential to the storage system and considered invalid by the storage system; and
    in response to the status identifier being indicative of a failing storage area that has not been used since the receipt of the initialization operation, skipping recovery processing on the storage area.

2. The method according to claim 1, further comprising:
    in response to receipt of the initialization operation to initialize the storage system, setting a status identifier of other storage area in the storage system to a status that indicates that the storage area does not currently have data available for access.

3. The method according to claim 1, wherein the managing the storage area based on the status identifier comprises:

in response to receipt of a write operation to write to the storage area, determining status of the status identifier; and in response to the status identifier being set to indicate that a storage area does not currently have data available for access clearing data in the storage system; writing data to a target address;

and setting the status identifier to a status that indicates the storage area already includes data associated with a read operation available for access.

4. The method according to claim 3, further comprising:
in response to the status identifier being set to a status that indicates the storage area already includes data associated with a read operation available for access writing target data associated with the write operation to a target address indicated by the write operation.

5. The method according to claim 1, wherein the managing the storage area based on the status identifier comprises:
in response to receipt of a read operation to read from the storage area, determining status of the status identifier; and in response to the status identifier being set to a status that indicates that the storage area does not currently have data available for access returning "empty;" otherwise returning target data from a target address in the storage area which is indicated by the read operation.

6. The method according to claim 1, further comprising:
in response to the status identifier being set to a status that indicates the storage area already includes data associated with a read operation available for access, recovering data, from an online storage device associated with the storage area, for writing into a backup storage area used for replacing the storage area.

7. The method according to claim 1, further comprising:
forbidding a read operation and a write operation from being performed on a storage area in the storage system, during an initialization operation to initialize the storage system.

8. The method according claim 1, wherein the obtaining a storage area in a storage system based on a predefined dividing rule comprises:
taking one or more stripes in the storage system as the storage area.

9. A system for managing a storage area, comprising:
one or more processors;
a non-transitory memory coupled to at least one processor of the one or more processors;
computer program instructions stored in the memory which, when executed by the at least one processor, cause the system to:
obtain a storage area in a storage system according to a predefined dividing rule;
determine status regarding whether the storage area has been used includes, in response to receipt of an initialization operation to initialize the storage system, setting the status identifier to a status that indicates that the storage area does not currently have data available for access without physically clearing data stored in the storage area prior to the initialization operation from the storage area;
set a status identifier for the storage area based on the use status;
manage the storage area based on the status identifier;
receive a rebuilding operation to rebuild the storage system, determining a status of the set status identifier, wherein the status identifier may be indicative of a failing storage area that has not been used since the receipt of the initialization operation and data stored in the storage area is inessential to the storage system and considered invalid by the storage system; and in response to the status identifier being indicative of a failing storage area that has not been used since the receipt of the initialization operation, skip recovery processing on the storage area.

10. The system according to claim 9, wherein the computer program instructions, when executed by the at least one processor, further cause the system to:
in response to receipt of the initialization operation to initialize the storage system, set a status identifier of other storage area in the storage system to a status that indicates that the storage area does not currently have data available for access.

11. The system according to claim 9, wherein the computer program instructions, when executed by the at least one processor, further cause the system to:
in response to receipt of a write operation to write to the storage area, determine status of the status identifier; and in response to the status identifier being set to indicate that a storage area does not currently have data available for access clear data in the storage system; write data to a target address; and set the status identifier to a status that indicates the storage area already includes data associated with a read operation available for access.

12. The system according to claim 11, wherein the computer program instructions, when executed by the at least one processor, further cause the system to:
in response to the status identifier being set to a status that indicates the storage area already includes data associated with a read operation available for access write target data associated with the write operation to a target address indicated by the write operation.

13. The system according to claim 9, wherein the computer program instructions, when executed by the at least one processor, further cause the system to:
in response to receipt of a read operation to read from the storage area, determine status of the status identifier; and in response to the status identifier being set to a status that indicates that the storage area does not currently have data available for access returning "empty;" otherwise return target data from a target address in the storage area which is indicated by the read operation.

14. The system according to claim 9, wherein the computer program instructions, when executed by the at least one processor, further cause the system to:
in response to the status identifier being set to a status that indicates the storage area already includes data associated with a read operation available for access, recover data, from an online storage device associated with the storage area, for writing into a backup storage area used for replacing the storage area.

15. The system according to claim 9, wherein the computer program instructions, when executed by the at least one processor, further cause the system to:
forbid a read operation and a write operation from being performed on a storage area in the storage system, during an initialization operation to initialize the storage system.

16. The system according to claim 9, wherein the computer program instructions, when executed by the at least one processor, further cause the system to:

take one or more stripes in the storage system as the storage area.

* * * * *